United States Patent [19]

Brown

[11] Patent Number: 4,846,103

[45] Date of Patent: Jul. 11, 1989

[54] COLLAPSIBLE DISPOSABLE LITTER CONTAINER

[76] Inventor: Frank Brown, 8 Tyson Shepway, North York, Ontario, Canada, M2J 4R9

[21] Appl. No.: 151,119

[22] Filed: Feb. 1, 1988

[51] Int. Cl.⁴ ............................................. A01K 45/00
[52] U.S. Cl. ..................................................... 119/1
[58] Field of Search ...................... 119/1, 19; 229/125, 229/164, 101

[56] References Cited

U.S. PATENT DOCUMENTS

| | | | |
|---|---|---|---|
| 1,677,654 | 7/1928 | Pitts | 229/125 X |
| 3,581,977 | 6/1971 | Kirsky et al. | 119/1 X |
| 3,890,930 | 6/1975 | Clark | 119/1 |
| 4,014,292 | 3/1977 | Coughlin et al. | 119/1 |
| 4,164,314 | 8/1979 | Edgar | 229/125 |
| 4,352,340 | 10/1982 | Strubelt | 119/1 |
| 4,391,223 | 7/1983 | Holland et al. | 119/19 |
| 4,501,226 | 2/1985 | Bienvenu et al. | 119/1 |
| 4,541,360 | 9/1985 | Higgins et al. | 119/1 |
| 4,548,160 | 10/1985 | Feitelson | 119/1 |
| 4,628,863 | 12/1986 | Eichenauer | 119/1 |

*Primary Examiner*—Gene Mancene
*Assistant Examiner*—R. Thomas Price
*Attorney, Agent, or Firm*—Ridout & Maybee

[57] ABSTRACT

A collapsible, disposable receptacle for the deposition, containment and disposal of the excrement of house pets is provided, having a frame comprising a tray with a bottom, sides and ends and side panels hingedly attached to the sides of the tray. The frame is enveloped in a flexible sheet adapted to form a collapsible tent supported by free ends of the side panels when extended and spanning therebetween, presenting an opening adjacent to one end of the tray, such that when the side panels are extended an enclosed space is created with an opening for entry and exit of the pet and when the side panels are collapsed the side panels and the flexible sheet form a closure for the tray for storage of unsoiled litter or disposal of soiled litter.

19 Claims, 5 Drawing Sheets

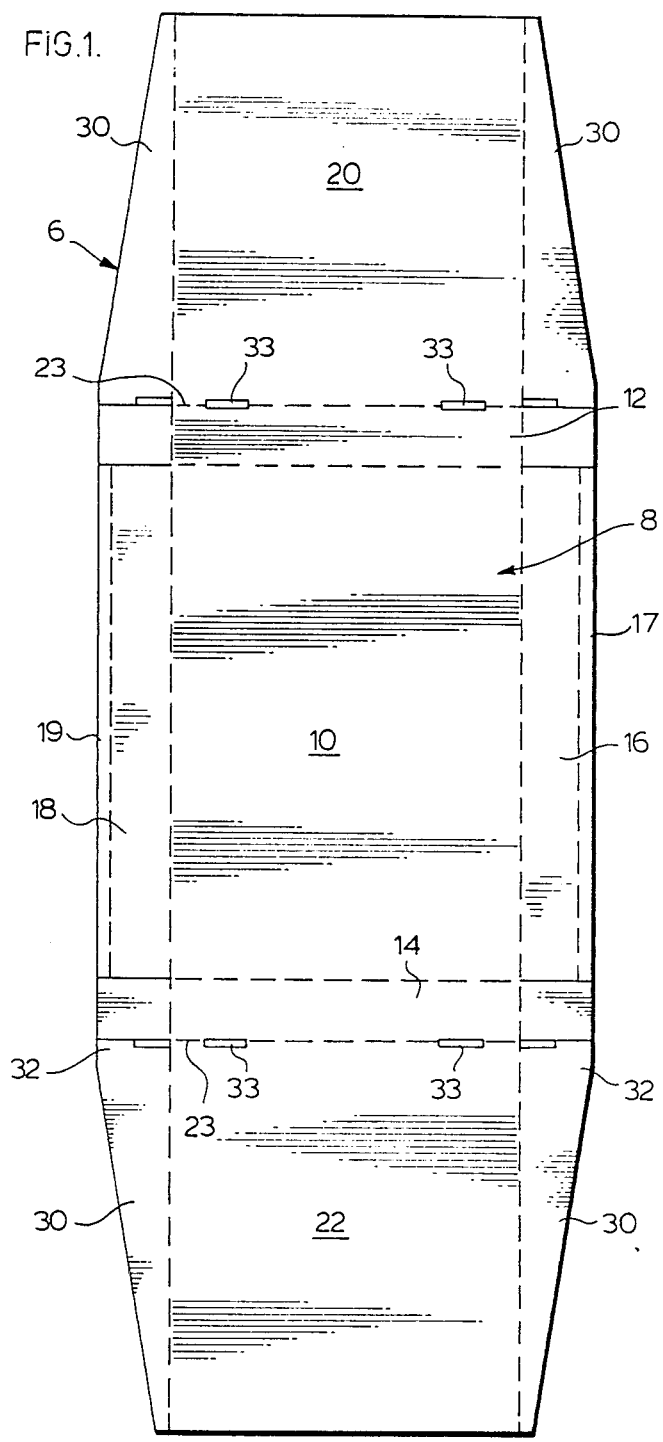

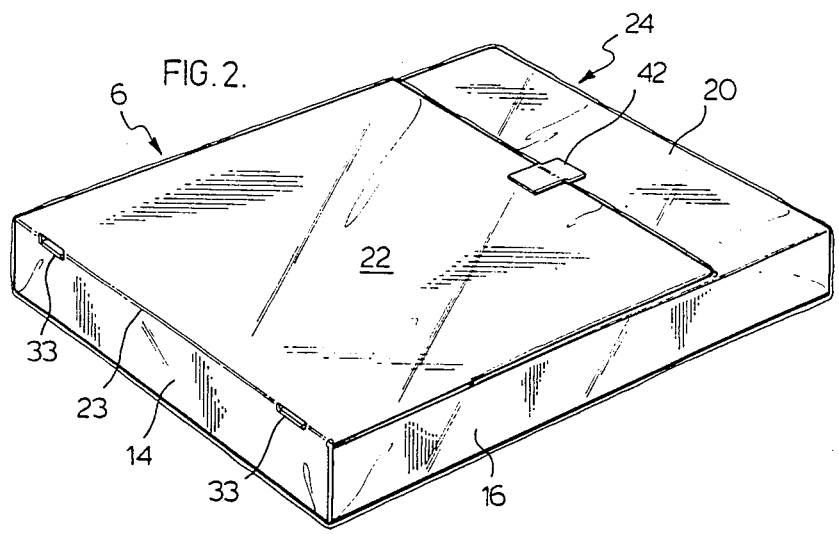
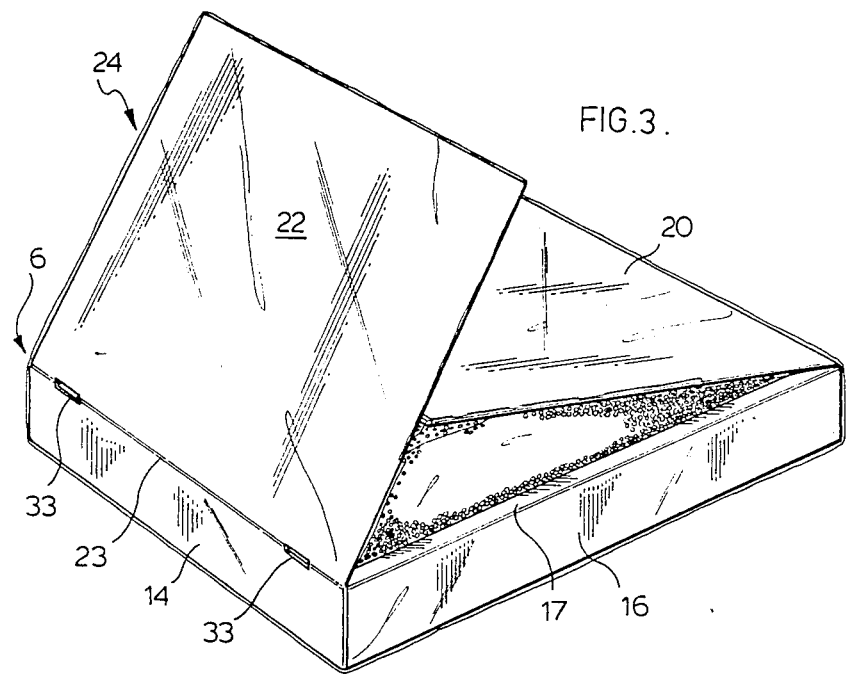

COLLAPSIBLE DISPOSABLE LITTER CONTAINER

FIELD OF THE INVENTION

The present invention relates to a receptacle for deposition, containment and disposal of the excrement of house pets.

In particular, the present invention provides a collapsible and disposable covered receptacle for deposition, containment and disposal of the excrement of house pets.

BACKGROUND OF THE INVENTION

House pets, and particularly cats, when confined inside a dwelling for an extended period require sanitary litter facilities for depositing and containing excrement. Such facilities are known to comprise a receptacle in the nature of a tray partially filled with pet litter absorbent material, typically a particulate clay compound.

Such receptacles pose a number of problems to the householder. The absorbent litter, while suitable for absorbing pet urine, does not typically absorb any substantial portion of the obnoxious odors produced by the excrement of house pets. These odors escape into the surrounding area and become an annoyance to the homeowner and other inhabitants of the dwelling. As well, the sight of soiled litter in a tray is distasteful to inhabitants of the dwelling.

Moreover, pets frequently instinctively attempt to bury their excrement, and in the process often end up broadcasting litter beyond the confines of the tray, where it can become entrapped in carpet fibres. Once litter has migrated into carpeting it is generally very difficult to remove, reducing the life of carpeting and often adding to the obnoxious odors tending to pervade the area of the dwelling surrounding the receptacle. Such stray litter particles can also be transported to other areas of the dwelling in the treads of shoes, increasing the difficulty of keeping the dwelling clean.

Furthermore, in order to retain such a receptacle in a sanitary condition and minimize obnoxious odors emanating therefrom, the absorbent litter must be cleaned and changed regularly. This involves periodically disposing of soiled litter and replacing it with unsoiled litter, a distasteful and messy chore which involves unpleasantly close contact with pet litter soiled by animal excrement. In fact, direct handling of soiled litter poses a danger to women of contacting toxoplasmosis during pregnancy.

The receptacle itself must be cleaned with a disinfecting cleaner for maximum sanitization, otherwise a residue of soiled litter particles will adhere to the receptacle walls when the litter is changed, contaminating the fresh litter.

Additionally, most commonly used pet litter contains a very fine particulate element which, when the litter is disturbed, billows into the air, to be inhaled by the unfortunate householder charged with changing the litter before settling all over the surrounding area.

Litter receptacles are known which consist of a tray and a compatible hood therefor forming an enclosed area having an opening for the entry and exit of the pet. Such a receptacle can be more effective than an uncovered litter tray at containing obnoxious odors and stray litter particles, and assists in shielding soiled litter from view, however it tends to be more difficult and time consuming to clean, and more expensive to construct.

It is also known to provide a litter tray which is disposable, thus obviating the need for removing soiled litter from the tray, disinfecting the tray and refilling it with fresh litter. However, such receptacles are far less effective at containing odors and stray litter particles than covered receptacles.

Known covered receptacles are too costly to replace to render discarding the entire receptacle economic, and too bulky to be discarded conveniently.

The present invention overcomes these disadvantages by providing a collapsible disposable litter receptacle, which in a collapsed condition forms a closed container for the storage or disposal of litter, and in an erected condition forms a covered receptacle creating an enclosed area for the deposition of excrement and containment of odors and stray litter particles, with an opening for entry and exit of the pet. When the litter becomes soiled, the receptacle may be conveniently collapsed and discarded.

The invention thus combines the advantages of a covered litter receptacle and the advantages of a disposable litter receptacle. The receptacle is lightweight and economic, and makes disposal of soiled litter easy and sanitary.

Moreover, as the receptacle may be acquired by the householder already partially filled with absorbent litter, the householder need never contact the litter directly or agitate the litter. By dispensing with the need to pour fresh litter from a bag into the tray, and to pour soiled litter from the tray into a container for disposal, the invention virtually eliminates the fine particulate element of the litter from the dwelling outside the confines of the receptacle.

SUMMARY OF THE INVENTION

In particular, the present invention provides a receptacle for the excrement of house pets, comprising a tray having a base and opposing sides and ends, with side panels hingedly attached to the sides of the tray. Each side panel has a free end and is adapted to swing from a collapsed position, forming at least a partial closure for the tray, to an extended position, standing generally upright. The receptacle further comprises means for maintaining the panels in the extended position, and a sheet of flexible material adapted to form a collapsible tent supported by the free ends of the extended panels and spanning therebetween, and presenting an opening between the side panels adjacent to one end of the tray, wherein when the side panels are extended an enclosed space is created with an opening for entry and exit of the pet, and when the side panels are collapsed, the side panels and the flexible sheet form a closure for the tray for storage of unsoiled litter or disposal of soiled litter.

BRIEF DESCRIPTION OF THE DRAWINGS

In drawings which illustrate by way of example only an embodiment of the invention, FIG. 1 is a plan view of a carton blank for constructing the receptacle of the invention;

FIG. 2 is a perspective view of the receptacle of the present invention in a collapsed condition;

FIG. 3 is a perspective view of the receptacle of the present invention in a partially erected condition;

DETAILED DESCRIPTION OF THE INVENTION

Figure 4:
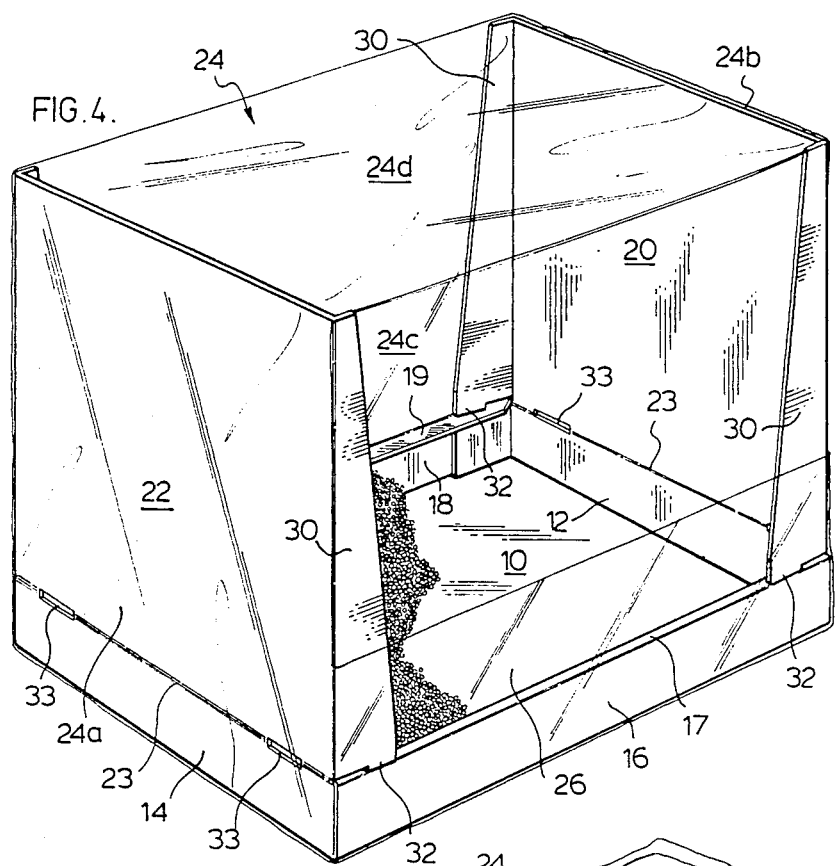
FIG. 4 is a perspective view of the receptacle of the present invention in a fully erected condition.

In a preferred embodiment of the invention, a frame 6 includes a tray 8 provided with a floor 10, sides 12, 14 and ends 16, 18 having lips 17, 19. The tray 8 should be large enough to accommodate the intended occupant of the receptacle.

Side panels 20, 22 are hingedly attached to sides 12, 14 of the tray 8 at score lines 23. The side panels 20, 22 can be formed integrally with the tray 8, as in the carton blank illustrated in FIG. 1. Side panels 20, 22 are thus adapted to swing from a collapsed position, illustrated in FIG. 2, wherein the side panels 20, 22 form a closure for the tray 8, to an extended position, illustrated in FIG. 4, wherein the side panels 20, 22 stand generally upright.

The side panels 20, 22 should preferably be substantially the same size, each having a width which spans the ends 16, 18 of the tray 8 and a length less than the side-to-side length of the tray but great enough such that when extended the side panels 20, 22 stand taller than the intended occupant of the receptacle.

Figures 5, 6:
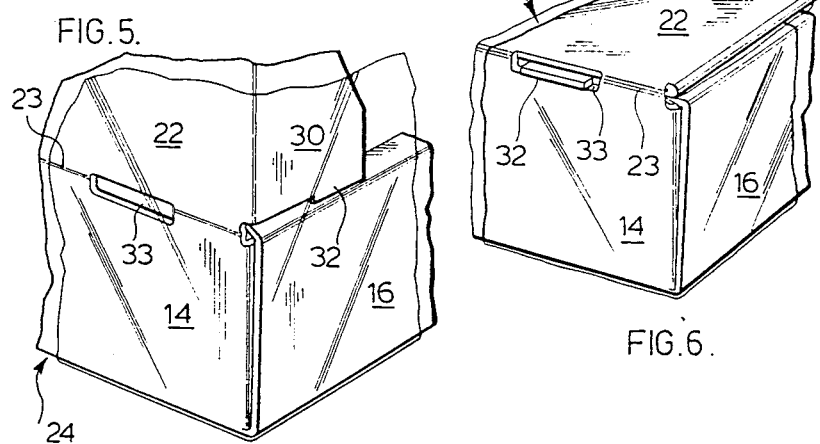
FIG. 5 is a partial perspective view of the receptacle of the present invention showing a preferred embodiment of the retaining means in extended position.
FIG. 6 is a partial perspective view of the receptacle of the present invention showing a preferred embodiment of the retaining means in collapsed position.

The frame 6 includes retaining flaps 30 hingedly attached to the side panels 20, 22 at the side margins thereof. The retaining flaps 30 are preferably formed integrally with the side panels 20, 22, as illustrated in the carton blank of FIG. 1. Each retaining flap 30 is provided with an extension 32 adapted to be lodged in a slot 33 along the score line 23 when the side panels are folded downwardly during manufacture or disposal, to prevent the flaps 30 from interfering with the flat folding of the panels 20, 22, as illustrated in FIG. 6. When the retaining flap 30 is extended the extension 32 is lodged on the upper side of the adjacent lip 17, 19, as illustrated in FIG. 5, or may be lodged in a crevice (not shown) between a tent 24 and an end of the tray 8 to retain the retaining flap 30 in extended position. Slots may be provided in the lips 17, 19 for this purpose.

The frame 6 should be composed of a material which is relatively rigid and inexpensive, such as corrugated cardboard or the like commonly used for packing cartons. The frame 6 must be rigid enough to support the weight of litter in the tray 8, as well as the tent 24, described in more detail below.

The frame 6 is enveloped in a tent 24, which is composed of a sheet of flexible material, preferably a lightweight plastic, having an open end adjacent to one end of the tray 8. The tent 24 is constituted by a continuous bag-like envelope, having, when in the erected condition, a rectangular bottom underlying the bottom 10 of the tray 8, rectangular sides 24a and b and a rectangular back 24c which are connected to or integral with the bottom of the bag and overlay the outer surfaces of the side panels 20, 22 and span the rear edges of the panels 20, 22, respectively, in the extended position. Connected to or integral with the top edges of the sides 24a, 24b and the back 24c of the envelope is a top 24d. The front edges of the top 24d and the sides 24a and b and the end 16 or a threshold barrier 26 define a generally rectangular opening.

The tent 24 is of sufficient breadth to permit the side panels 20, 22 of the enveloped frame 6 to be unfolded to the extended position, but not further. Preferably in the erected condition the tent 24 is stretched taut, so that it exerts resilient compressive forces retaining the flaps 30 firmly engaged on the lips 17, 19. The tent 24 may include a threshold barrier 26 which forms a barrier of extended height along the bottom of the opening 28 to block stray litter particles displaced by the pet during use of the receptacle.

During manufacture the frame 6 is enveloped in the tent 24 as described above. The tray 8 is filled with a suitable layer of unsoiled absorbent litter, and the side panels 20, 22 are collapsed, with the tent 24, to form a closure for the tray 8, as illustrated in FIG. 2. The receptacle may be stored in this condition until use. The collapsed receptacle may be tied with or encased in strapping or shrinkwrap or another suitable packaging material to retain it in collapsed condition and prevent spillage of litter during transport.

In use the householder places the collapsed receptacle in a suitable location for use by the house pet. The householder then unfolds the side panels 20, 22 to the extended position and reaches through the opening 28 to manually unfold the retaining flaps 30 to their extended position, as illustrated in FIGS. 4 and 5. The extension of the side panels 20, 22 erects the tent 24, which is supported by the free ends of the side panels 20, 22. The thus erected tent 24 forms a barrier over the top and rear of the area defined between the side panels 20, 22, creating an enclosed space for the occupant of the receptacle with an opening for entry and exit thereby. The tent 24 also enshrouds the entire frame 6, to capture any leakage from the tray 8 and provide structural reinforcement for the floor 10, which may be weakened by exposure to pet urine, as well as to prevent over-extension of the side panels 20, 22.

The side panels 20 22 may be retained in the extended position in a number of ways. Preferably retaining means consist of retaining flaps 30 hingedly attached to the side panels 20, 22, as described above. When extended, the retaining flaps 30 resist the tendency for the tent 24 to collapse the side panels 20, 22, thus providing a stable structure maintaining the tent 24 in erected condition.

Figure 7:
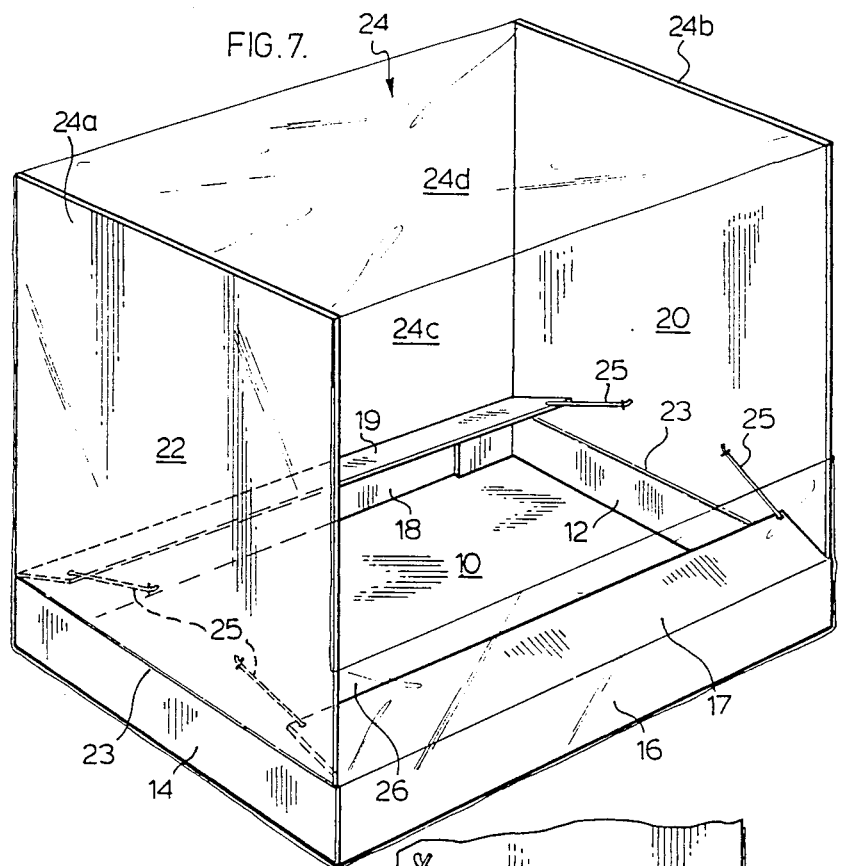
FIG. 7 is a perspective view of another embodiment of the receptacle of the present invention in erected condition showing a further preferred embodiment of the retaining means.
Figure 8:
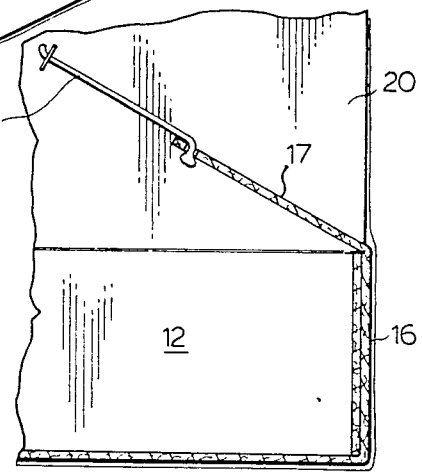
FIG. 8 is a partial cross-section showing the retaining means of FIG. 7.

The side panels 20, 22 may be retained in the extended position by any other suitable retaining means. For example, lips 17, 19 can be extended to form flaps hingedly attached to the ends 16, 18 of the tray 8 and may be affixed by resilient means such as an elastic band 25, to suitable locations on the inside of the side panels 20, 22, upwardly from the score line 23, such that when the side panels 20, 22 are extended the flaps are drawn upwardly to rest obliquely against the side panels 20, 22 to retain same in the extended position, as illustrated in FIGS. 7 and 8. To collapse the receptacle, the flaps are depressed downwardly and the side panels 20, 22 are collapsed as described below.

Figure 9:
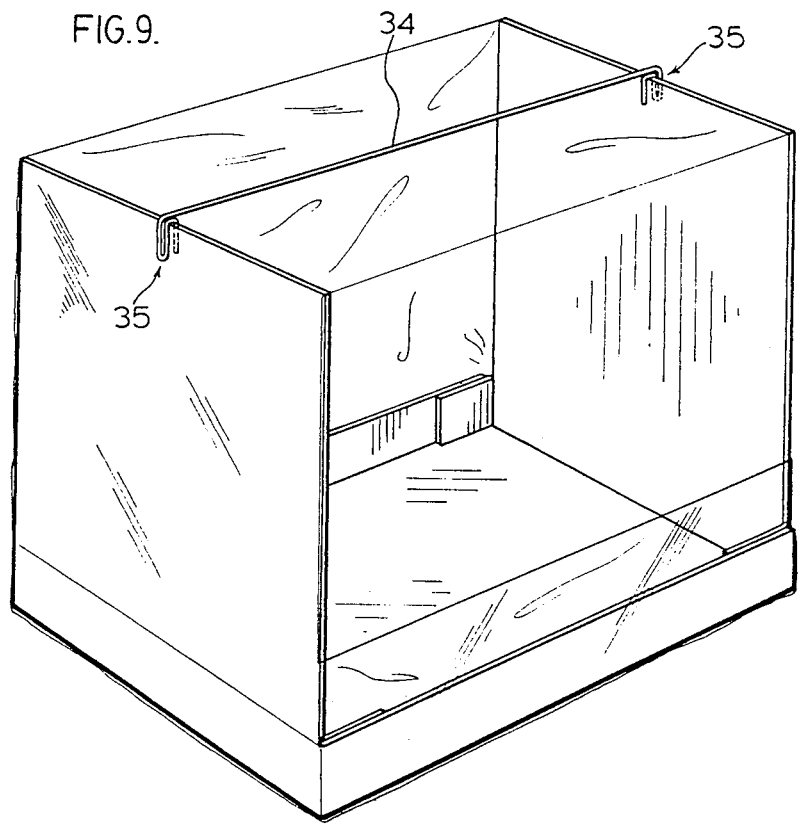
FIG. 9 is a perspective view of another embodiment of the receptacle of the present invention in erected condition showing a still further preferred embodiment of the retaining means.
Figure 10:
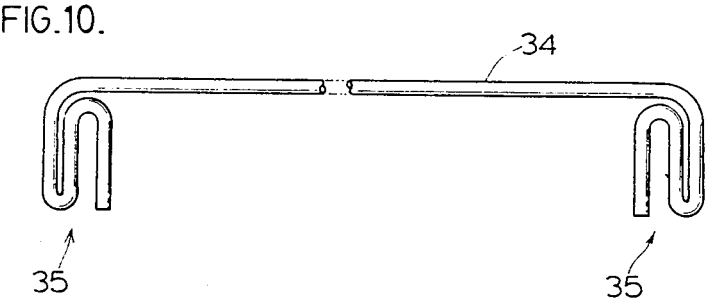
FIG. 10 is a side plan view of the retaining means illustrated in FIG. 9.

In a further preferred embodiment, retaining means comprises a rigid rod 34 composed of metal wire or another suitable material, at the ends of which are clip formations 35, as illustrated in FIG. 10. Preferably the clip formations 35 comprise mutually inverted U-shaped portions adapted to releasably engage the free ends of the side panels 20, 22 to maintain same in spaced apart relation, as illustrated in FIG. 9. The ends of the rod 34 will perforate the tent 24 when the clip formations 35 are engaged with the side panels 20, 22, but because the tent 24 is made of a resilient material the leakage of odor through the resulting perforations is insignificant. To collapse the receptacle, the clip formations 35 are disengaged from the respective side panels 20, 22, and the rod 34 may be placed in the tray 8 for storage or disposal. The receptacle is then collapsed in the manner described below.

It is also possible to include biasing means, such as torsion springs, inside the side panels 20, 22 at their point of attachment to the sides 12, 14 of the tray. One side of each torsion spring is affixed by known means to the inner wall of each of the sides 12, 14, and the other side of the torsion spring bears against the inner wall of the corresponding side panel 20 or 22. When the packaging or tie retaining the receptacle in collapsed condition is removed, the side panels 20, 22 spring upwardly to the extended position under the force of the torsion springs, erecting the tent 24, and are retained in the extended position under the force of the torsion springs and opposed by resilient compressive forces of the tent 24 on the side panels 20, 22.

In all cases, the retaining means should be rigid enough to retain the side panels 20, 22 in the extended position during normal use of the receptacle, and should be easy to dislodge or collapse by the householder when desired. Further, the retaining means should not considerably obstruct the opening of the tent 24.

Once the litter has been soiled, the householder collapses or removes the retaining means retaining the side panels 20, 22 in extended position, which in the preferred embodiment utilizing retaining flap 30 involves manually dislodging the extension 32 of each retaining flap from the lip 17 or 19 or respective crevice and folding each retaining flap 30 against the respective side panel 20, 22. The householder then collapses the side panels 20, 22, one at a time, still enveloped in the tent 24, as illustrated in FIG. 3.

As the frame 6 is collapsed, the flexible sheet material of the top 24d and the back 24c of the tent can be gathered or pleated between or on the overlapping panels 20, 22, so that it snugly encloses the folded frame 6.

Reusable adhesive tape 42 may be provided at a convenient location on the tent 24 adjacent to the free end of one of the side panels 20, 22 to retain the receptacle in collapsed condition, as illustrated in FIG. 2. Alternatively, the tent 24 may be provided with sets of complimentary strips or ribbons which may be tied together for this purpose. The receptacle can then be discarded in its entirety.

The tent 24 assists in the containment of stray litter and obnoxious odors. It may comprise an odor absorbing material to enhance the latter function. The tent 24 should also be opaque, to shield the contents of the tray 8 from view.

Portions of the tray 8 may be covered with a water resistant film to prevent weakening of portions of the tray 8 which may be exposed to liquid excrement, and preferably the tent 24 underlies the floor 10 of the tray 8 for additional resistance to leakage and structural support.

It is common for a house pet to instinctively attempt to bury its excrement after urination or defecation. In such cases the pet tends to broadcast litter toward its rear end, which, unless the pet changes its orientation after stepping into the receptacle, will coincide with the opening in the tent 24, resulting in the broadcast of stray litter out of the opening. While this is to some extent prevented by the threshold barrier 26, the threshold barrier 26 cannot extend too high or the pet will not be able to traverse the opening.

It is thus preferable to encourage the pet to change its orientation to one where its rear end faces either of the side panels 20, 22 of the receptacle, in order to avoid the broadcast of litter outside the receptacle. This can be accomplished by proportioning the tray 8 such that the front-to-back depth of the tray 8 is too small to accommodate the pet lengthwise, while the side-to-side length of the tray is suitable to accommodate the pet lengthwise. Thus, the pet, in order to comfortably use the receptacle, must after entering the enclosed area change its orientation so that it faces one or other of the side panels 20, 22. The dimensions of the side panels 20, 22 and the tent 24 should be selected accordingly.

The foregoing description of the subject invention is by way of example only. Various modifications will be obvious to persons skilled in the art, and it is intended to include all such modifications as fall within the scope of the claims.

I claim:

1. A receptacle for the excrement of house pets, comprising:
    a tray having a floor and opposing sides and ends,
    side panels hingedly attached to the sides of the tray, each side panel having a free end and being adapted to swing from a collapsed position, forming at least a partial closure for the tray, to an extended position,
    means for maintaining the side panels in the extended position, and
    a sheet of flexible material forming a collapsible tent supported by and attached to the free ends of the extended panels and spanning therebetween, and presenting an opening between the side panels adjacent to one end of the tray
    wherein when the side panels are extended an enclosed space is created with an opening for entry and exit of the house pet, and when the side panels are collapsed the tray is covered by the side panels and the flexible sheet for storage of unsoiled litter or disposal of soiled litter.

2. A receptacle as defined in claim 1 wherein means for retaining the side panels in the extended position comprises retaining flaps hingedly attached to the side panels.

3. A receptacle as defined in claim 2 wherein the retaining flaps are each adapted to swing from a collapsed position adjacent to the respective side panel to an extended position.

4. A receptacle as defined in claim 3 wherein each retaining flap is provided with an extension protruding from a lower margin thereof adapted to be lodged between an end of the tray and the tent when the retaining flap is in the extended position.

5. A receptacle as defined in claim 1 wherein means for retaining the side panels in the extended position comprises a rod including means for engaging the free ends of the side panels.

6. A receptacle as defined in claim 5 wherein means for engaging the free ends of the side panels comprises clip formations.

7. A receptacle as defined in claim 1 wherein the tray and side panels are composed of cardboard.

8. A receptacle as defined in claim 7 wherein at least a portion of the tray is covered with a water resistant film.

9. A receptacle as defined in claim 1 wherein the tent includes a threshold barrier extending along a lower portion of the opening.

10. A receptacle as defined in claim 1 wherein the flexible material is composed of plastic.

11. A receptacle as defined in claim 1 wherein the flexible material comprises an odor absorbing material.

12. A receptacle for the excrement of house pets, comprising:

a frame including a tray having a floor and opposing sides and ends and side panels hingedly attached to the sides of the tray, each side panel having a free end and being adapted to swing from a collapsed position, forming at least a partial closure for the tray, to an extended position, and means for retaining the side panels in an extended position, wherein the side panels support a sheet of flexible material forming a collapsible tent attached to the frame and presenting an opening between the side panels adjacent to one end of the tray to create an enclosed space with an opening for entry and exit of the house pet.

13. A receptacle for the excrement of house pets, comprising, in combination, a tray having a floor and opposing sides and ends, side panels hingedly attached to the sides of the tray, each side panel having a free end and being adapted to swing from a collapsed position, forming at least a partial closure for the tray, to an extended position, means for maintaining the side panels in the extended position, and a bag-like envelope forming a collapsible tent supported by and attached to the free ends of the extended panels and spanning therebetween, and presenting an opening between the side panels adjacent to only one end of the tray, wherein when the side panel are extended an enclosed space is created with an opening for entry and exit of the house pet, and when the side panels are collapsed the tray is covered by the side panels and the bag-like envelope for storage of unsoiled litter or disposal of soiled litter.

14. A receptacle as defined in claim 13 wherein means for retaining the side panels in the extended position comprises a rod including means for engaging the free ends of the side panels.

15. A receptacle as defined in claim 13 wherein the tray and side panels are composed of cardboard.

16. A receptacle as defined in claim 15 wherein at least a portion of the tray is covered with a water resistant film.

17. A receptacle as defined in claim 13 wherein the bag-like envelope includes a threshold barrier extending along a lower portion of the opening.

18. A receptacle as defined in claim 13 wherein the bag-like envelope is composed of plastic.

19. A receptacle as defined in claim 13 wherein the bag-like envelope comprises an odor absorbing material.

* * * * *